(No Model.)
N. THULL, Jr., & N. WEBER.
THRASHING MACHINE.
No. 369,570. Patented Sept. 6, 1887.
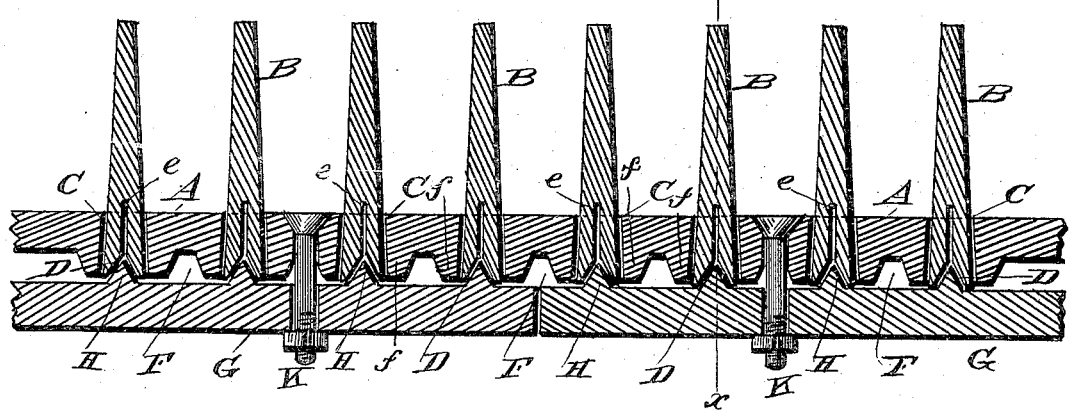
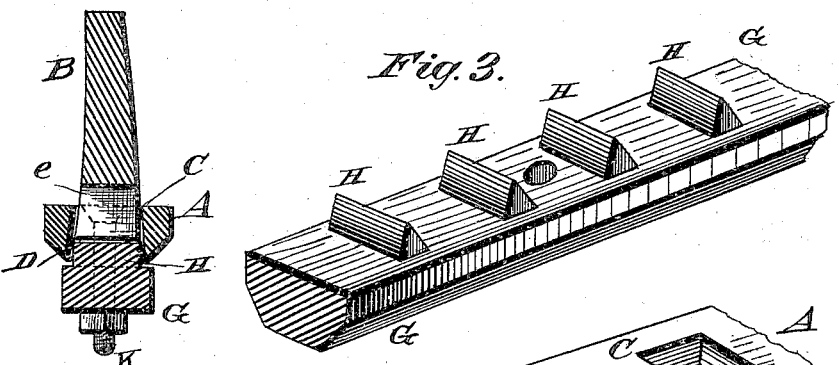
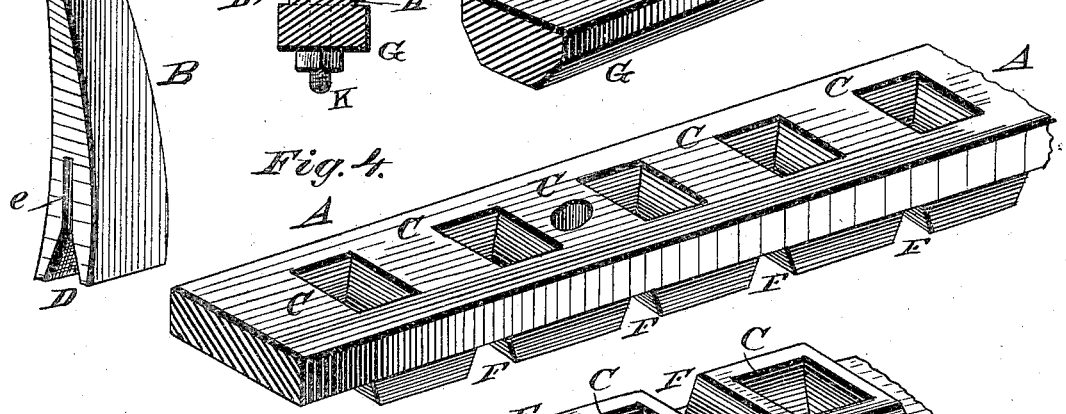
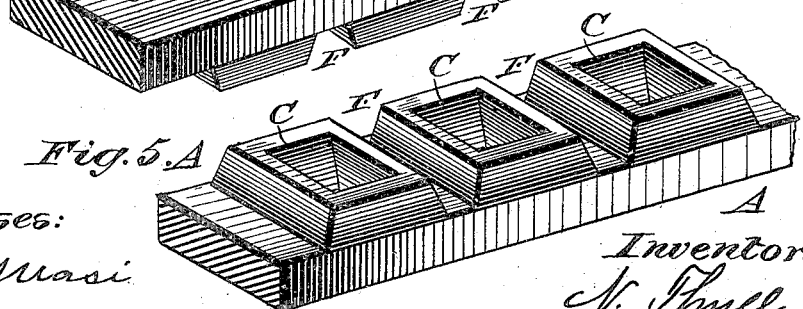
Witnesses:
Phil. C. Masi
Theo. Mungen
Inventors:
N. Thull Jr
N. Weber
by Anderson & Smith
Attorneys

United States Patent Office.

NICHOLAS THULL, JR., AND NICHOLAS WEBER, OF MARYVILLE, MISSOURI.

THRASHING-MACHINE.

SPECIFICATION forming part of Letters Patent No. 369,570, dated September 6, 1887.

Application filed September 28, 1886. Serial No. 214,732. (No model.)

*To all whom it may concern:*

Be it known that we, NICHOLAS THULL, Jr., and NICHOLAS WEBER, citizens of the United States, and residents of Maryville, in the county of Nodaway and State of Missouri, have invented certain new and useful Improvements in Thrashing-Machines; and we do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a vertical longitudinal section of one of the bars and attached teeth. Fig. 2 is a transverse vertical section of the same on the line $x$ $x$ of Fig. 1. Fig. 3 is a broken perspective view of the bar G. Fig. 4 is a similar view of the top of the bar A. Fig. 5 is a perspective view showing the bottom of the same, and Fig. 6 is a perspective view of one of the teeth.

This invention relates to the cylinders and concaves of thrashing-machines; and it consists in the novel construction and combination of devices, hereinafter described and claimed, whereby the teeth are securely fastened.

In the accompanying drawings, the letter A designates a bar, which is designed to be secured upon the cylinder or in the concave and serves to support the teeth B, a series of these bars being used. The bars A may be secured in position by bolting their ends to a properly-formed cylinder or to the concave heads.

The seats or openings C in the bar A for the teeth are made somewhat tapering from the inside outward, to suit the taper form of the larger end of the tooth.

Each tooth B is made with an inverted-V-form notch, D, in its inner or larger end, said notch being continued for a short distance into the tooth in the form of a cleft or kerf, $e$, as indicated in the drawings. The teeth, being passed through the seats in the bar A from the inside outward, are designed to have their inner or larger ends fit and fill the seats somewhat neatly, their inner terminations being flush, or nearly so, with the inner openings of the seats. Usually notches F are made in the inner surface of the bar A between the seats C, so that the teeth are each inserted in a corresponding socket, which is formed by the side walls of the notches, as shown in Fig. 5.

The wedge-bars G are made with inverted-V-form projections H at proper distances apart to enter the notches in the ends of the teeth when the bar G is applied to the inner surface of the bar A. These wedge projections are made a little full as compared with the notches of the teeth, so that when pressed forward in their seats they will keep the teeth in their places and greatly strengthen the teeth.

The wedge-bars G are forced into and secured in place by screw-bolts K, and serve to spread the ends of the teeth in their tapering seats, and thereby effect a secure fastening which is not liable to become loose from the jar of the parts when at work.

Having described this invention, what we claim, and desire to secure by Letters Patent, is—

The combination of the bar A, having tapering seats, the teeth tapered to fit in said seats and provided in their larger ends with inverted-V-shaped notches, the bars G, provided with inverted-V-shaped projections to enter the notches in the teeth, and the screws or bolts and nuts for holding the bars A and G together, substantially as specified.

In testimony whereof we affix our signatures in presence of two witnesses.

NICHOLAS THULL, JR.
NICHOLAS WEBER.

Witnesses:
  CHAS. HYSLOP,
  W. A. HOOPER.